Jan. 30, 1940.　　　　O. J. HORGER　　　　2,188,862
LOCOMOTIVE VALVE GEAR BEARING
Filed July 14, 1938
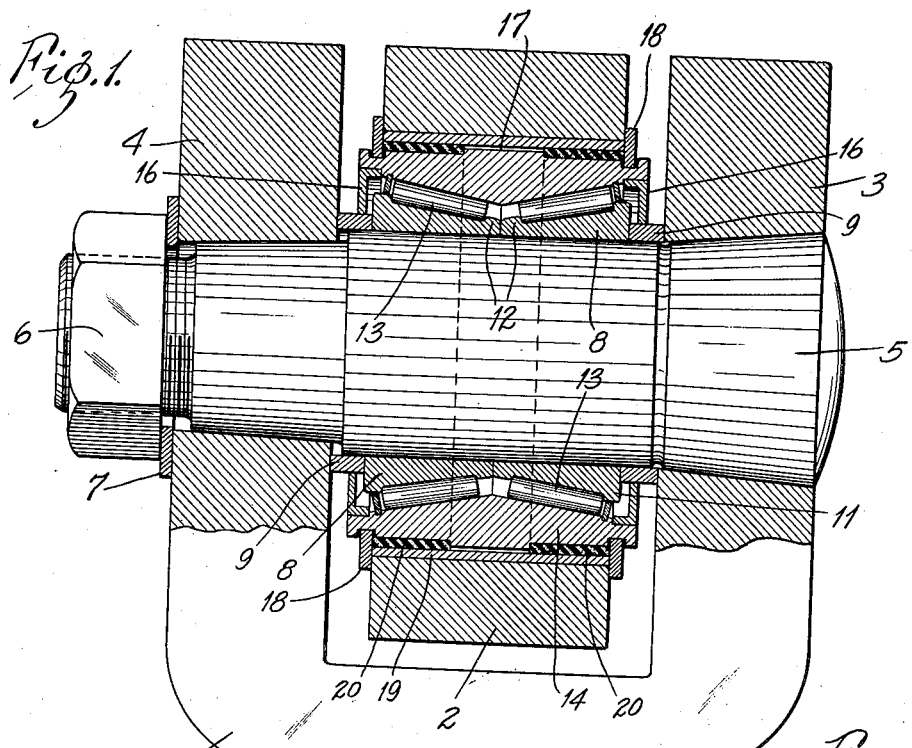
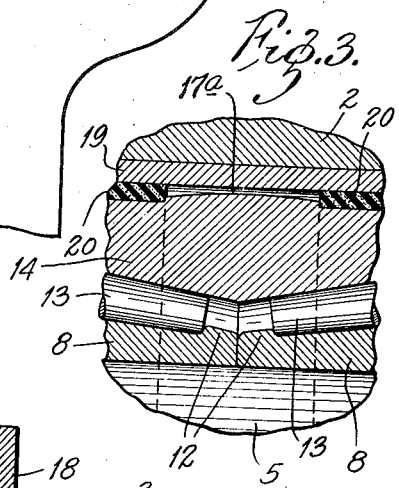
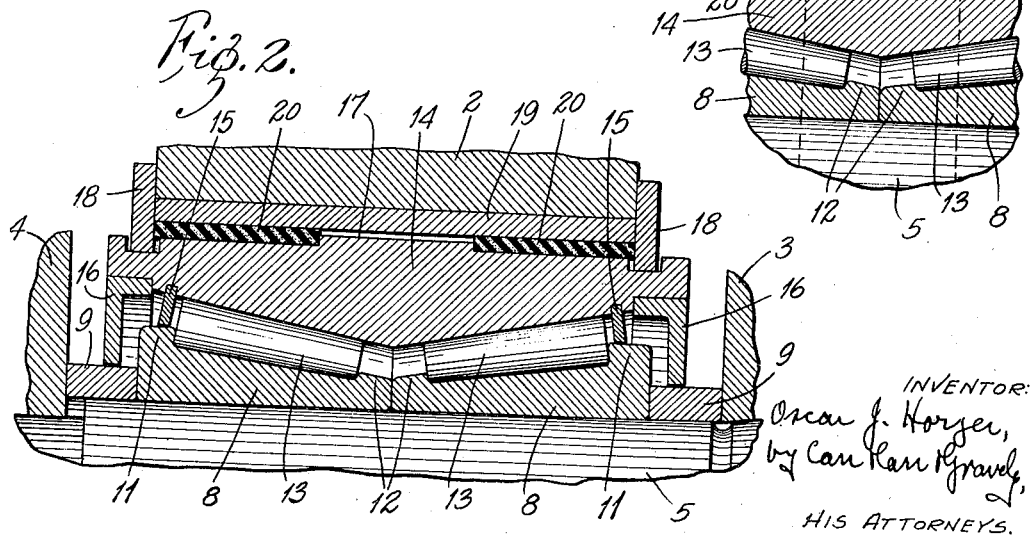
INVENTOR:
Oscar J. Horger,
by Cau Kau Gravely,
HIS ATTORNEYS.

Patented Jan. 30, 1940

2,188,862

UNITED STATES PATENT OFFICE 2,188,862

LOCOMOTIVE VALVE GEAR BEARING

Oscar J. Horger, Canton, Ohio, assignor to The Timken Roller Bearing Company, Canton, Ohio, a corporation of Ohio Application July 14, 1938, Serial No. 219,128

1 Claim. (Cl. 308—184)

The links and rods of a locomotive valve gear are required to move rapidly and to reverse their direction of movement with a suddenness which imposes considerable shock on the floating bearings by which they are articulated together. Besides, under certain service conditions, there is a tendency for a link to swing about one or the other of its ends or to rotate about its longitudinal axis. Consequently, the bearings are liable to wear rapidly and impair the accuracy of timing of the valve movements.

The principal object of the present invention is to devise a roller bearing suitable for use in such valve gear and which will not only be capable of absorbing shocks thereon but which will be durable and self-alining under all conditions of service. The invention consists in the combinations of parts hereinafter described and claimed.

In the accompanying drawing, wherein like numerals refer to like parts wherever they occur:

Fig. 1 is a longitudinal sectional view of a locomotive valve gear joint embodying my invention;

Fig. 2 is an enlarged sectional view of a portion of the joint shown in Fig. 1; and Fig. 3 is a longitudinal sectional view of a modification wherein the rib of the outer raceway member is convexed endwise.

Referring to Fig. 1, 1 represents a link with its end bifurcated, and 2 represents a second link whose end is located between the forks 3, 4 of the first link. One fork 3 of the bifurcated link has a hole or bore therethrough whose surface tapers from the outside of said fork to the inside. In the other fork 4 of said bifurcated link and in alinement with the hole in the first fork is a hole or bore of smaller diameter than the first mentioned hole and with its wall tapering from the inside of said fork to the outside. Extending through the holes in said bifurcated end is a pin 5 with tapering portions fitting the tapered holes in the forks and with a cylindrical portion between said tapered portions and with a threaded end extending beyond said smaller hole. On this tapered end is a nut 6 which bears against a washer 7 which is interposed between it and the outer face of the adjacent fork of the bifurcated link. The second link has an eye through which the link pin 5 extends. A roller bearing is interposed between the wall of the eye and the link pin.

In the construction illustrated, the roller bearing comprises two cones or inner raceway members 8 mounted on the link pin 5 with their smaller ends abutting against each other and with spacing members 9, preferably split rings, interposed between the thick ends of said cones and the inner faces of the forks of the bifurcated link. These cones or inner raceway members have a relatively small taper and are provided with circumferential ribs 11, 12 at both ends of their raceway surfaces, the rib 11 at the thick end serving to take the end thrust of the rollers and the rib 12 at the thin end serving to keep the rolls in position. On each of the inner raceways is a series of tapered pins, that is, rollers 13 with small taper, arranged substantially in contact with each other sidewise in a complete circular series.

Surrounding the tapered pins or rollers 13 is the outer raceway member 14. This outer raceway member is preferably a single annular piece which is thickest midway of its length and has its inner surfaces tapering toward its ends to form the outer raceways for the tapered pins or rollers 13. Beyond the ends of the tapered pins, the outer raceway member has annular grooves in which are mounted suitable oil or dust rings 15; and at each end of said outer raceway member is mounted a dust ring 16 whose inner edge is substantially in contact with the spacing rings 9 that space the inner bearing members from the forks of the bifurcated link.

The outer surface of the outer raceway member is substantially cylindrical but has a circumferential rib 17 about midway of its length. Said outer raceway member also has circumferential grooves in its surface near the ends thereof in which are mounted split rings 18 or other suitable retaining devices. Fitted in the eye of the second link is a cylindrical sleeve 19 whose inside diameter is somewhat larger than the diameter of the rib 17 of the outer raceway. Rings 20 of synthetic rubber or other elastic material are mounted in the spaces bounded endwise by the ends of the rib and the retaining rings and bounded crosswise by the outer surface of the outer bearing member and the sleeve in the eye of the second link.

The hereinbefore described construction operates as follows: When the locomotive is running, the joints of the valve linkage system are subject to considerable jerking and jarring; but in my device, the shock due to such jerking and jarring is, to a large extent, cushioned and absorbed by the elastic rings and thus the bearing is, to a large extent, protected from such shock. If the load, due to the inertia of the moving link, is excessive, the elastic rings become compressed to such extent that the circumferential rib on the outer raceway member will bear directly against the sleeve in the eye of the link. Thus the shock is cushioned without excessive play between the two links, that is, without permitting such play as would interfere substantially with the timing of the valve. As the circumferential rib on the outer raceway member is near the middle thereof and the cushion rings are around the outer end portions of said outer raceway member, it is possible for the eye link to rotate somewhat on its longitudinal axis or swing slightly about its end and thus shift slightly from its true position relative to the link pin. Special provision may be made for such rocking or tilting movement of the eye link by making the circumferential rib of the outer bearing member convex endwise, as illustrated at 17a in Fig. 3.

By using tapered pins or rollers with relatively small taper, and arranging them in a complete circular series, the bearing takes up considerably less space in a radial direction than would be required for the more common type of tapered roller bearing. Thus, the bearing above described is available for use for replacing the old-fashioned pin and bushing bearing commonly used with the locomotive valve gears. The bearing described is self-centering and self-alining and requires less attention and is much more durable than the pin and bushing bearing commonly used.

I claim:

In a roller bearing mounting, a cylindrical sleeve, a bearing cup therein having a circumferential rib near the middle of its outer surface, the space between said rib and said sleeve being less than the space between said sleeve and any other portion of said cup and elastic rings filling the spaces between the end portions of said cup and the end portions of said sleeve, the ends of said cup having circumferential grooves and retaining rings of smaller width than said grooves disposed in said grooves, whereby the elastic rings are largely relieved of end thrust and endwise movement of said bearing cup is limited by said retaining rings.

OSCAR J. HORGER.